Figure 1:
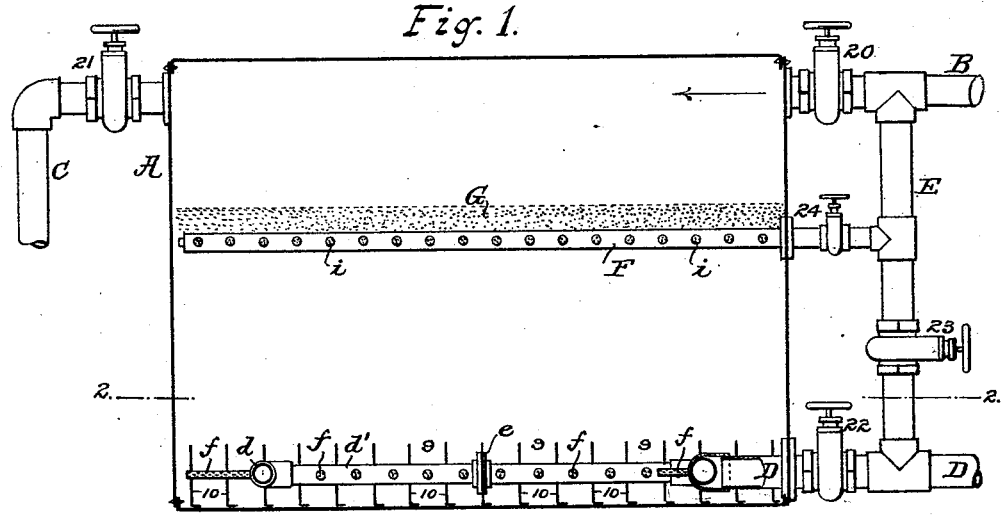

(No Model.)  2 Sheets—Sheet 1.

W. M. DEUTSCH.
FILTER.

No. 484,781. Patented Oct. 25, 1892.

Witnesses
Chas. Hanimann
N. Marler

Inventor
William M. Deutsch
By his Attorney
Geo. H. Graham (No Model.) 2 Sheets—Sheet 2.
W. M. DEUTSCH.
FILTER.
No. 484,781. Patented Oct. 25, 1892.
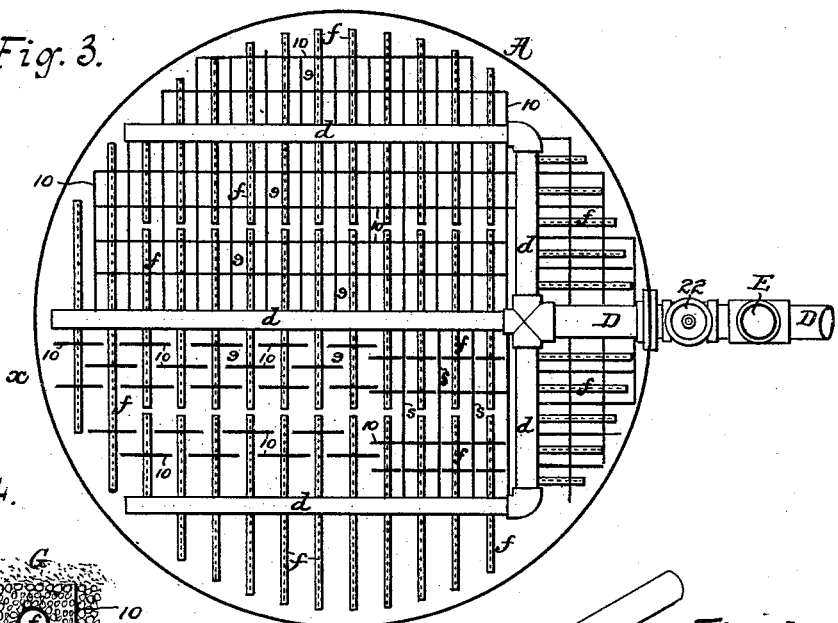
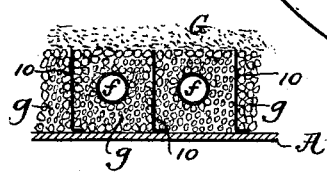
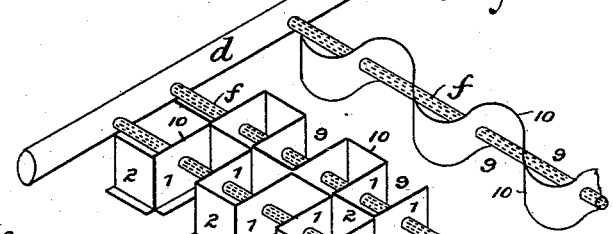
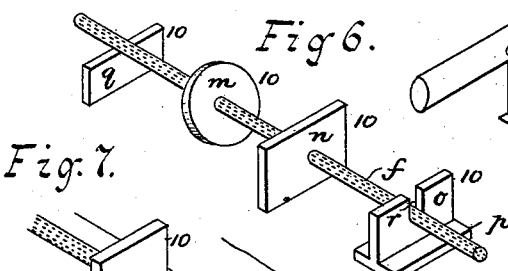
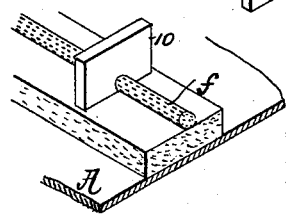
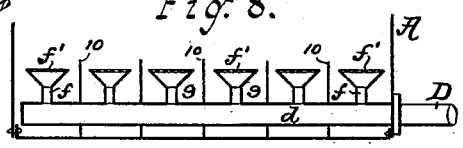
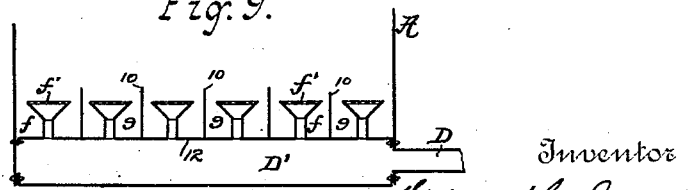
Witnesses
Chas Hanimann
N Marler
Inventor
William M. Deutsch
By his Attorney
Geo. H. Graham
THE NORRIS PETERS CO., PHOTO-LITHO., WASHINGTON, D. C.

UNITED STATES PATENT OFFICE.

WILLIAM M. DEUTSCH, OF ELIZABETH, NEW JERSEY.

FILTER.

SPECIFICATION forming part of Letters Patent No. 484,781, dated October 25, 1892.

Application filed May 1, 1891. Serial No. 391,225. (No model.)

*To all whom it may concern:*

Be it known that I, WILLIAM M. DEUTSCH, a citizen of the United States, residing in the city of Elizabeth, county of Union, and State of New Jersey, have invented certain new and useful Improvements in Filters, fully set forth in the following description, and represented in the accompanying drawings.

The present invention is alike applicable to that general class of filters in which the cleansing or purifying of the liquid is effected by allowing the liquid to pass or percolate through a body or mass of granular material and to that more general class in which is employed an arrangement of piping within the filtering vessel or holder either for a conduit for the filtered liquid from the vessel or as a means for cleansing the filtering material or in which the same piping is used for both or for other purposes, the invention being also applicable to such filters whether they be designed for filtering water in large quantities, supplying, for instance, factories, towns, or cities, or for filtering water or other liquid in smaller quantities for special purposes and uses. In this general class of filters, of which Letters Patent No. 355,004, granted to me December 28, 1886, is a type, the bottom or lower portion of the filter vessel or holder is occupied by an arrangement of piping to draw or receive the filtered liquid from the bed of filtering material and conduct it to the supply pipe or main for use. This same arrangement of piping also provides an economical method of cleansing the bed of filtering material by reversing the current of liquid through the filter.

The present invention, while embodying these important features of the old filter, has for its object to increase the effectiveness of the filtering or cleansing or bed-washing operation, or both, to dispose and arrange the interior piping so that the liquid is distributed evenly with equal pressure to all parts of the filter in the cleansing operation, to provide a convenient mode of sustaining and bracing the arrangement of piping against the weight of the bed of filtering material, and to improve the general construction and arrangement of the filter.

To these ends the invention consists, in combination with an orifice or conduit for the passage of the liquid from or to the filter-vessel, of means for dividing the area of the filter common to the orifice or conduit into a plurality of pockets or chambers.

It also consists in dividing the interior arrangement of piping into a number of independent or separated operating-surfaces by means of diaphragms or separating-partitions, whereby definite portions of the piping are restricted to definite areas.

It furthermore consists in dividing the area of the filter into a plurality of pockets or chambers formed by a number of vertical walls or partitions which provide supports for the piping or its branches, and also in disposing the interior arrangement of piping so that the area of the supply-orifice for the cleansing operation will be slightly greater than the total area of the distributing-orifices of the interior piping or of its branches, whereby the pressure is equalized throughout said branches.

With this general statement of the objects and purposes of the invention, a detailed description of the same will now be given, reference being had to the accompanying drawings, which illustrate a practical embodiment of the invention in connection with that type of filter of which that of my said patent is an example.

Figure 2:
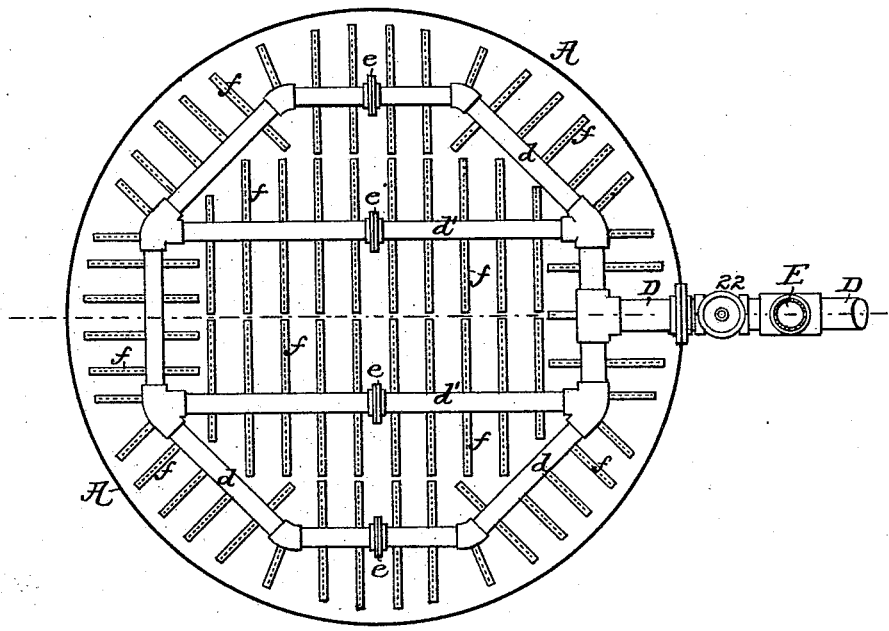

In said drawings, Figure 1 is a central vertical section of a filter provided with the invention. Fig. 2 is a horizontal section of the same, taken on the line 2 2, the separating-partitions for the sake of perspecuity being omitted. Fig. 3 is a similar view of a modified arrangement of the interior piping and branches, some of the separating-partitions being shown in place. Fig. 4 is an enlarged sectional view of the piping and partitions, showing the body of granular material within the space formed by the partitions and surrounding the piping. Fig. 5 is a perspective view of a portion of the piping, illustrating the separating-partitions and the manner in which the partitions may be formed. Fig. 6 is a similar view illustrating different forms of the partitions, which merely for convenience are assembled on the same piping. Fig. 7 is a similar view of another form of the partition and support for the piping. Fig. 8 is a sectional view of the modified form of the piping and the separating-partitions. Fig. 9 is a similar view illustrating another arrangement of the conduit and connecting-piping.

It is to be understood that, while the improvements now to be described are shown combined with a particular type of filter, they have been so shown as a convenient means of illustrating their function and operation, as it will be obvious that many features of the invention are applicable to other types of apparatus.

The filter holder or vessel A, hereinafter termed the "filter," may be of any of the well-known forms, being shown herein of closed cylindrical form, made of sheet metal, and of any proper dimensions suited to the particular purposes for which it may be used. It is connected at or near its upper end with an induction-pipe B, having a valve 20, by which the liquid from any source of supply enters the filter. It is also connected near said upper end with a waste-pipe C, having a valve 21, through which the liquid used in washing the filter and filtering material may be allowed to pass off to the sewer, settling-basin, or the like. The filter is also connected at a point near its bottom with a pipe D, having a valve 22, employed during the filtering operation as an eduction-pipe for conveying off the filtered liquid to the distributing-main and at other times as an induction-pipe for a reverse operation of the filter, as in the filter and filtering-material washing operation. The two pipes B and D are connected by a vertical pipe E, having a valve 23 therein, which pipe is also connected with a pipe F, having a valve 24 therein and leading into the filter at a point intermediate of its top and bottom and slightly below the normal surface of the bed of filtering material G, with which the filter is partially filled, by which pipe F and its laterally-extending perforated branches $i$ the upper portion of the bed may be washed.

The pipe D, through which the filtered liquid passes after being filtered, enters the filter preferably at or near its bottom and is provided therein with a number of branches $d$, suited to the area of the filter. In Fig. 2 the pipe D is shown immediately connected with a continuous outer branch of hexagonal form extending around the interior of the holder at a short distance from the wall and with a pair of direct branches $d'$, connecting opposite portions of the continuous outer branch $d$. These branches are formed of the ordinary piping united together by the usual elbows, T's, and other pipe-unions, and when the holder is of considerable size the branches will be assembled in two substantially-equal portions, which when in position are united by couplings $e$. The proportion of the branches $d$ and $d'$ to the pipe D will be such that the supply of liquid will not be impeded. Another form of this interior arrangement of piping is shown in Fig. 3, and it is obvious that other arrangements might equally well be used and yet obtain the required service to all parts of the filter equally, which is of particular advantage in the washing operations.

The branches $d\,d'$ are provided with a number of smaller laterally-extending auxiliary branches $f$, which extend horizontally at or near the bottom of the filter and which collectively substantially embrace the entire horizontal area thereof. By thus disposing the auxiliary branches as soon as the liquid being filtered reaches substantially the lower portion of the bed of filtering material it will be freely conducted outward by such branches, thereby causing the liquid to percolate evenly through the entire bed of filtering material direct to some portion of the conduit, and thus preventing the formation of cross or lateral currents, which cause the filtering liquid to pass through the bed in defined courses to the exclusion of other portions of the bed. This same important function of the auxiliary branches in reaching the entire longitudinal area of the filter is also effective in thoroughly washing the bed upon a reversal of the current. These auxiliary branches are much smaller in diameter than the branches $d\,d'$, are secured so as to project centrally therefrom, and are perforated throughout their entire surfaces, as well as at their ends, for the passage of the liquid to or from the branches. The size of the perforations and their number in the entire structure will be such as to present an area collectively slightly less than the area of the pipe D, so that the filtered liquid passing through the perforations will pass out freely by the pipe D. This feature is also of great consequence in the practical operation of the filter, in that as the arrangement of branches practically embraces the entire horizontal area of the filter any obstruction to the free passage of the filtered liquid would result in causing lateral currents of the liquid through the bed of filtering material or excess of flow through certain portions thereof, which this practical covering of the entire area of the filter is designed to prevent.

The area of the filter—in this case the horizontal area—immediately adjacent the pipe D, and particularly its branches, is divided up into a number of pockets or chambers 9, formed by separating-partitions 10, (see Figs. 1 and 3,) which individualize portions of the piping and insure the complete action of each portion thereof independent of the other portion, thus extending the effectiveness of the branches throughout their entire area. In one form of this part of the invention, as shown in Figs. 3 to 5, inclusive, the separating-partitions are assembled in intimate relation with the auxiliary branches $f$, dividing each branch into separate areas, and thus in a measure dividing each particular branch up into a series of separate or individual areas, restricting the function of each separated portion of the branches and at the same time forming a convenient means for confining certain portions of the bed of filtering material around the piping.

In my said patent, No. 355,004, the auxiliary branches *f* were surrounded by considerably-larger pipes and the space between them inside the larger pipe was filled with a coarse granular material—such as fine gravel or pebbles—a little larger than the perforations in each of the pipes. By the present invention the necessity for these enveloping-pipes is obviated and the granular material *g*, coarser than the material of the filtering-bed and slightly larger than the perforations in the branches, is placed in the pockets or chambers formed by the separating-partitions around and above the branches. The partitions thus serve, in addition to the function above stated, to hold or confine this coarse material in contact with the perforated branches and prevent it from being dislodged.

The separating-partitions may obviously be modified widely in form and arrangement and may partake of various shapes. Thus in Fig. 5 it is shown as made of sheet metal bent so that adjacent portions extend at right angles to other portions, whereby each pocket is formed by three sides 1 2 1 of one partition and a side 2 of the contiguous similarly-bent partition. The partition for each branch is preferably formed of a continuous sheet of metal from end to end, and the portions forming the sides 1 are perforated to receive the perforated branch *f*, which, as the partition rests in practice on the base of the filter-holder, thus forms an effective support for the branch both at or near its outer end and at intermediate points, materially strengthening the arrangement of piping and aiding these slender branches to withstand the weight of the filtering material and liquid above them, which, owing to the weakening effect of the numerous perforations therein, is of great importance in filters of considerable size.

In Fig. 6 there are shown several forms of the partitions associated with a single branch *f*. One form consists of a disk *m*, perforated centrally to allow the branch *f* to pass therethrough. Another is a rectangular plate *n*, also perforated for the branch *f*, and another a plate *o*, of similar form, with a foot or base piece *p* to rest on the base or other part of the filter and provided with a slotted opening *r* to receive the branch *f*. This latter form has certain advantages over the other two forms in that it may be placed in position resting upon its foot *p* in the filter independent of the piping, its slotted opening *r* permitting the branches to pass therein from the top and rest at the bottom of the slot. Another form *q* is also shown, serving principally to support the auxiliary branch from the filter-bottom. Yet another form is shown in Fig. 7, wherein the branches *f* rest upon a base of concrete or similar material and the partitions 10 extend upward therefrom, while embracing the branches. When the partitions 10 of the forms *m*, *n*, or *o* are used, those on contiguous branches may overlap one another, as indicated at *x*, Fig. 3, or they may extend in right lines with one another, with a separating-partition *s* between them, as is also indicated in said figure.

It is not essential to the proper carrying out of the invention that the perforated auxiliary branches *f* should laterally extend from the discharge-pipe or its branches, but, as shown in Fig. 8, they may extend vertically from the discharge-pipe, with enlarged or funnel-shaped ends *f'*, having perforated tops, and in this structure the separating-partitions will be similarly arranged to separate each auxiliary branch from the others and to form pockets around each of them, which may contain a body of coarse granular material, as before explained; and, again, the filter, as shown in Fig. 9, may be provided with a false bottom 12, providing a bottom chamber D', in communication with and forming a part of the discharge pipe or conduit D. From this false bottom 12 branches *f'*, similar to those of Fig. 8, will extend vertically secured therein in any suitable manner, and with them will be associated the separating-partitions 10, as before, forming pockets around each of the branches, to be filled with coarse granular material, if desired.

No detailed description of the operation of the filter thus improved is deemed necessary; but it may be briefly stated that in the operation of filtering the liquid from any source of supply will pass into the filter by the induction-pipe B, its valve 20 being open, (the valves 21, 23, and 24 being first closed and the valve 22 of the discharge-pipe opened.) The liquid will percolate evenly through all parts of the filtering-bed G and finally reach the body of coarse material *g* within the pockets formed by the partitions 10 and around the perforated branches *f*. It will then pass through this body of material *g* and by the perforations into the branches *f* evenly throughout the series of said branches, thence into the branches *d* and *d'* and into the discharge-pipe to the place of use.

In the bed-washing operation the valve 20 will be closed and the valves 21 and 23 opened. The liquid will then pass from the pipe B by the vertical pipe E to the pipe D and by the branches *d d* into the perforated branches *f*, which by reason of the arrangement of the branches *d* will supply the liquid at an equal pressure to the entire body of perforated branches, whereby the liquid in this washing operation will be evenly distributed throughout the entire bed of filtering material, remove all the impurities held thereby, and pass out by the waste-pipe C to the sewer or the like.

Should it be desired to obtain only a partial washing of the bed—as, for instance, its upper portion, which usually is the most foul—the valves 22 and 23 will be closed and the valve 24 opened, whereupon the liquid will pass by the pipe F and its perforated branches $i$ into the filter, and, passing upward, will evenly wash that portion of the bed above said branches and pass out with the impurities by the waste-pipe C, as before.

What is claimed is—

1. The combination, with the filter and the filtering-bed, of a conduit arranged within the filter and connected with an external discharge or delivery pipe, a plurality of perforated branches extending out of said conduit, and partitions arranged across such perforated branches, so as to form independent pockets, chambers, or inclosures around said branches, substantially as and for the purpose set forth.

2. The combination, with the filter and the filtering-bed, of a number of branch pipes leading to different parts of the filter-bed, a plurality of smaller perforated pipes extending laterally from the said branch pipes, and a plurality of partitions arranged across the said perforated pipes to subdivide the filter-bed in proximity to each such pipe into a number of separate independent pockets, chambers, or inclosures, and a body of coarse material located within the said pockets, chambers, or inclosures in contact with the said perforated pipes, substantially as and for the purpose set forth.

3. The combination, with the filter and the filtering-bed, of a discharge-pipe therefor having perforated branches within the filter and a plurality of partitions associated with said branches and forming supports therefor, substantially as described.

4. The combination, with the filter and the filtering-bed, of a discharge-pipe therefor having a plurality of perforated branches within the filter, a plurality of partitions associated with said branches and forming supports therefor, and a body of coarse material located in the spaces formed by the partitions, substantially as described.

5. The combination, with the filter and its discharge-pipe, of the continuous branch pipe $d$, arranged within the filter and having perforated branches, and the transverse connection $d'$, also having perforated branches, the branch pipe and the transverse connection being assembled in two separate substantially-equal portions, and couplings $c$, uniting the said separate portions of said pipes, the whole arranged so as to cover a maximum of the horizontal area of the filtering-bed, substantially as described.

6. In a filter, the combination, with a perforated branch pipe, of a partition supporting the same and extending on both sides to divide the branch pipe into separate areas, substantially as described.

7. The combination, with a perforated branch pipe, of a continuous partition supporting the same and bent from side to side thereof alternately to divide the branch pipe into separate areas, substantially as described.

In testimony whereof I have set my hand, this 20th day of April, A. D. 1891, in the presence of two witnesses.

W. M. DEUTSCH.

Witnesses:
E. F. AYRAULT,
GEO. H. GRAHAM.